United States Patent
Souma et al.

(10) Patent No.: US 6,648,298 B2
(45) Date of Patent: Nov. 18, 2003

(54) ELECTROMAGNETIC FUEL INJECTION VALVE

(75) Inventors: Masahiro Souma, Hitachi (JP); Yasuo Namaizawa, Ishioka (JP); Hiromasa Kubo, Yokohama (JP)

(73) Assignees: Hitachi Car Engineering Co., Ltd., Ibaraka (JP); Hitachi, Ltd., Tokyo (JP)

( * ) Notice: Subject to any disclaimer, the term of this patent is extended or adjusted under 35 U.S.C. 154(b) by 73 days.

(21) Appl. No.: 09/875,938

(22) Filed: Jun. 8, 2001

(65) Prior Publication Data

US 2002/0008220 A1 Jan. 24, 2002

(30) Foreign Application Priority Data

Jul. 6, 2000 (JP) ........................................ 2000-210713

(51) Int. Cl.⁷ ............................................... F16K 31/02
(52) U.S. Cl. .................. 251/129.21; 123/472
(58) Field of Search .................. 251/129.15, 129.21, 251/129.01; 239/585.1, 585.4, 585.5; 123/472, 470

(56) References Cited

U.S. PATENT DOCUMENTS

| | | | | |
|---|---|---|---|---|
| 3,420,496 A | * | 1/1969 | Hallberg | 251/129.15 |
| 3,593,241 A | * | 7/1971 | Ludwig | 251/129.15 |
| 3,712,581 A | * | 1/1973 | Parlow | 251/129.15 |
| 3,757,263 A | * | 9/1973 | Saarem et al. | 251/129.15 |
| 4,403,765 A | * | 9/1983 | Fisher | 251/129.15 |
| 4,409,580 A | * | 10/1983 | Ishigaki | 251/129.15 |
| 4,417,717 A | * | 11/1983 | Moller | 251/129.21 |
| 4,967,966 A | * | 11/1990 | Babitzka et al. | 251/129.15 |
| 5,236,174 A | | 8/1993 | Vogt et al. | |
| 6,012,655 A | * | 1/2000 | Maier | 239/585.1 |

FOREIGN PATENT DOCUMENTS

DE 198 53 102 A1 * 11/1998 ............ 251/129.15

* cited by examiner

Primary Examiner—Gene Mancene
Assistant Examiner—John Bastianelli
(74) Attorney, Agent, or Firm—Dickstein Shapiro Morin & Oshinsky LLP

(57) ABSTRACT

The present invention provides a fuel injection valve including a stationary core and a movable core having one end opposed to one end of the stationary core, the movable core being movable toward the one end of the stationary core upon magnetization of the stationary core and a valve on the other end of the movable core and movable with the movable core, the valve being supported by a valve seat base and a cylindrical body extends from at least the stationary core to the base.

27 Claims, 5 Drawing Sheets

(1)

(2)

ELECTROMAGNETIC FUEL INJECTION VALVE

FIELD OF THE INVENTION

The present invention relates to fuel injection valves, in particular, an electromagnetic fuel injection valve suitable for an internal combustion engine.

DISCUSSION OF THE RELATED ART

Electromagnetically operated fuel injection valves for internal combustion engines are now widely used. A fuel injection valve of this type, is generally provided with a housing, an electromagnetic coil, a stationary core, a valve element with a movable core (anchor), a valve seat base, a valve holder, a return spring member and various intermediate/connecting elements. The movable core is adapted to be electromagnetically driven by the electromagnetic coil, and the valve member, connected to the movable core, is adapted for movement therewith into and out of sealing engagement with a valve seat. The spring member resiliently biases the movable core and the valve member toward the valve seat. When the electromagnetic coil is electrically energized, the movable core and the valve member are electromagnetically driven away from the valve seat against the spring force so that liquid fuel is forced out of the injector through the injector orifice into an associated internal combustion engine. When the electromagnetic coil is de-energized, the movable core is returned by the spring force so that the valve member is moved into sealing engagement with the valve seat to interrupt the injection of the liquid fuel.

The valve seat base is supported by the valve holder and the valve holder is typically coupled with the stationary core via the connecting elements which are made of non-magnetic material. The connecting element serves to guide the stroke of the anchor as well as seal fuel which resides between the core and the valve holder. The connecting element is made of non-magnetic material such that it would not interfere with the operation of the anchor, when one end of the anchor is magnetically attracted to one end of the stationary core.

The stationary core is welded to the connecting elements, which in turn, are welded to the valve holder, which in turn, is welded to the valve seat base. Hence, the conventional fuel injection valve has many parts, requiring increased weld points and associated production costs.

SUMMARY OF THE INVENTION

The present invention provides a fuel injector valve having reduced number of component parts requiring a reduced number of weld points.

In an object of the invention, a fuel injection valve is provided comprising a magnetic coil and a stationary core adapted to be magnetized upon energization of the magnetic coil. A movable core having one end opposed to one end of the stationary core is also provided, the movable core being movable toward the one end of the stationary core upon magnetization of the stationary core. Also, a valve element on the other end of the movable core is provided which is movable with the movable core to open and close a fuel injection port. The valve element is supported in a valve seat base. Further, a cylindrical body extending from at least the stationary core to the valve seat base is provided which guides the movable core and supports the base.

BRIEF DESCRIPTION OF THE DRAWINGS

The above advantages and features of the invention will be more clearly understood from the following detailed description which is provided in connection with the accompanying drawings.

FIG. 3 (2) illustrates a cross-sectional view of another example of the embodiment as described in FIG. 2;

DETAILED DESCRIPTION OF THE INVENTION

Figure 1:
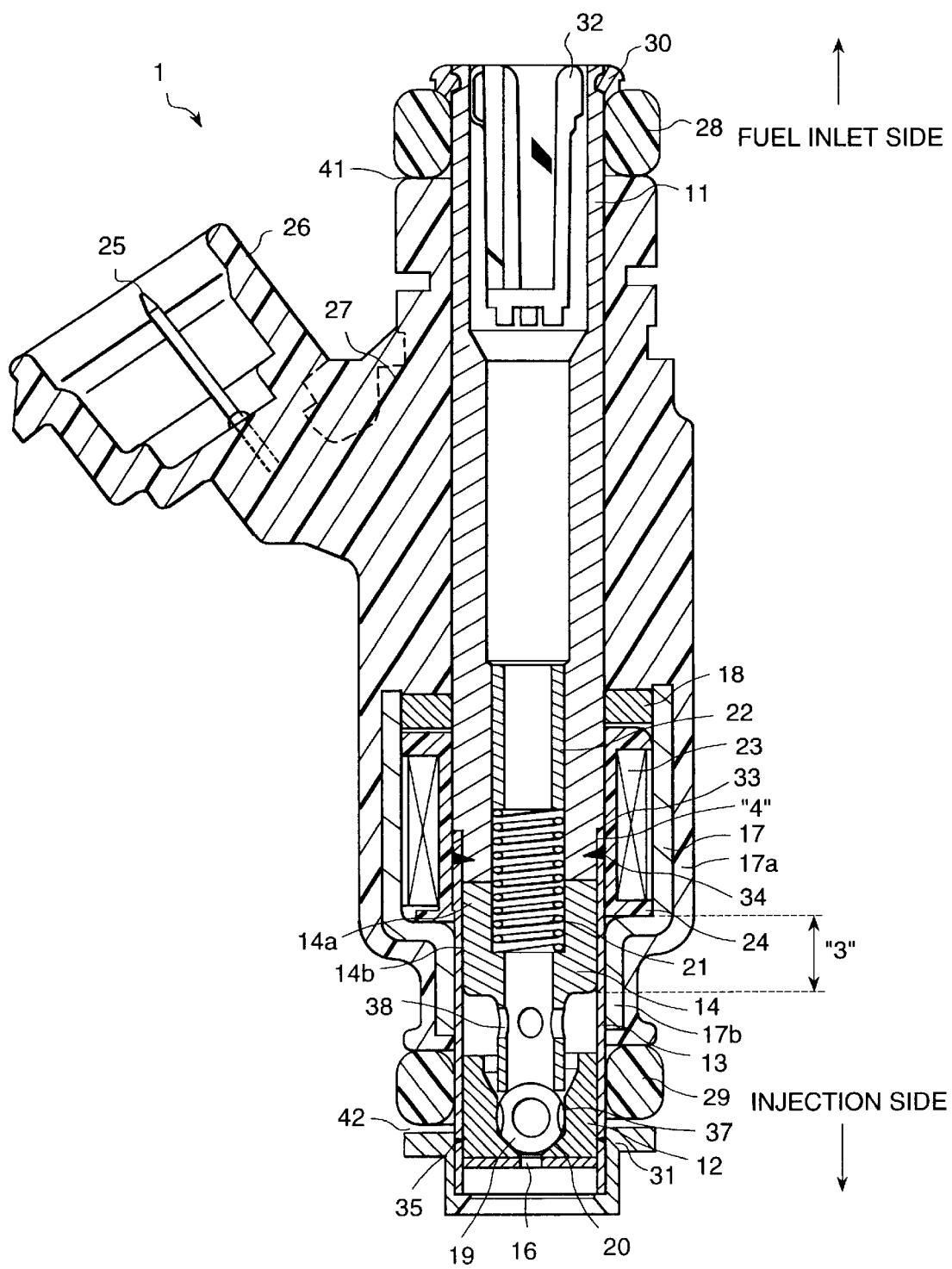
FIG. 1 illustrates a cross-sectional view of a first embodiment of the present invention.

Exemplary embodiments of the present invention will be described below in connection with the drawings. Other embodiments may be utilized and structural or logical changes may be made without departing from the spirit or scope of the present invention. Although the invention is described in terms of an automobile component, namely, an automobile fuel inject on valve, the invention is applicable to other combustion motors utilizing a fuel injector valve. Like items are referred to by like reference numerals throughout the drawings.

Referring now to FIG. 1, a fuel injection valve main body 1 comprises a stationary core 11 arranged to a central section thereof, an electromagnetic coil 23 arranged on an outer periphery of a lower end section (one end on a fuel inlet side) of the core 11 via a bobbin 24, a housing 17 for accommodating coil 23 and a core plate 18 providing magnetic connection between the housing 17 and the core 11. A section 17a of the housing 17 houses the electromagnetic coil 23. Further, exterior molding 27, preferably resin, for covering an outer periphery of the housing 17 and the core 11 is provided. Also, a cylindrical body 13 for supporting a valve seat base 12 and for guiding an anchor 14 is provided. Body 13 extends from at least the lower end of the core 11 to the valve seat base 12. Hence, body 13 serves to guide the anchor 14 as it is magnetically attracted to one end of the core 11 or when it returns to its "resting state" by spring force and it also serves to support the valve seat base 12 to maintain its structural integrity.

The housing 17 is fixedly attached to body 13 and core plate 18 which, in turn, is attached to core 11. Note, housing 17 is also attached to anchor 14, via body 13, and in magnetic communication with it. The electromagnetic coil 23 is housed within an inner periphery of housing 17, core plate 18, core 11 and anchor 14. Hence, a magnetic circuit is formed comprising the core 11, the housing 17, the core plate 18, and the anchor 14.

The core 11 comprises a hollow inner section which serves as a fuel passage. A filter 32 is provided at an upper end (inlet side of fuel) of the core 11. At a lower end of the core 11 is provided a spring 21 and a spring adjuster 22 for adjusting the spring force. The spring 21 presses the valve element composed of the anchor 14 and a ball valve 19 to a seat section 20 of the valve seat base 12.

Coil 23 is electrically coupled with a connector terminal 25 which receives a signal from, an outer section (for instance, an engine control unit). This electrically coupled section is provided in an inner section of the injection valve main body 1 in the exterior molding 27. The connector terminal 25 is connected to a terminal of an outer section via a coupler 26.

The exterior molding 27 of the present invention is provided from mounting positions of O rings 28 to 29 provided at both ends in an axial direction of the injection valve main body 1. An annular groove 41 is provided between an upper end face of the exterior molding 27 and an annular stopper (O ring stopper) 30 which is mounted on an outer periphery of an upper most end of the core 11. The O ring 28 (on an inlet side of fuel) is installed in this annular groove 41. Further, an annular groove 42 is also provided between a lower end face of the exterior molding 27 and an annular stopper (O ring stopper) 31 mounted on an outer periphery of a lower most end of the cylindrical body 13. The O ring 29 is installed in this annular groove 42. The stoppers 30 and 31 prevent the O rings from coming off and the O rings 28 and 29 serve sealing functions at the mounting positions of the fuel injection valve.

The cylindrical body 13 is installed to a lower end of the injection valve main body 1 and one end of the cylindrical body 13 is provided on a lower end outer periphery of the core 11. The body 13 is preferably provided to fit flush against an inlet such that the outer periphery of core 11 and body 13 are in the same axial plane, providing a smooth, continuous outer surface. The body 13 has a thickness 4 and is preferably about 0.1 mm to about 1.0 mm wide. The body 13 is coupled with the core 11 by means of welding (numeral 34 denotes a welding section). Preferably, section 34 is laser welded with at least one streak of entire circumferential welding so as to maintain air tightness. Step difference 33 serves as an inlet section for the cylindrical body 13. The inlet section is provided between coil 23 and core 11.

Hence, cylindrical body 13 includes a portion for guiding an anchor 14 and a portion for retaining or supporting the valve seat base 12. The valve seat base 12 includes a guide section 37 for movably guiding an outer periphery section of the ball valve 19 and a seat section 20 formed at the base of guide section 37.

The valve seat base 12 is coupled with the cylindrical body 13 by means of welding. This welding is performed at a position on an inlet side of fuel (welding position 35) towards the base of the valve seat base 12. The welding is preferably performed by laser with at least one streak by entire circumferential welding from an inner peripheral side of the cylindrical body 13 so as to maintain air tightness between the cylindrical body 13 and the valve seat base 12. The orifice plate 16 having one hole or more is coupled with the base of the valve seat base 12.

The injection valve main body 1 is further provided with an overlap portion 3 comprising the cylindrical body 13, anchor 14 and housing 17. Further, section 17b of the housing 17 is coupled with the cylindrical body 13 by press fitting and the O ring 29 is provided on the injection side from this housing 17 in order to maintain air tightness between the engine and the injection valve.

The anchor 14 is provided with a difference in outer diameters between an upper section outer periphery 14a thereof and a lower section outer periphery 14b thereof. The outer diameter of the lower section outer periphery 14b thereof is made slightly smaller than the outer diameter of the upper section outer periphery 14a thereof. A section to be movably guided by the outer periphery of the cylindrical body 13 is the upper section outer periphery 14a thereof. In this way, a portion of the anchor 14 is moved by an inner periphery of the cylindrical body 13, thus, reducing sliding friction and allowing a smoother operation of the valve element. Spring 21 is provided in an upper section inner periphery of anchor 14 and one end of the spring is accepted by means of the anchor 14.

Hence, when a current is carried to the coil 23, the core 11, the core plate 18, the housing 17 and the anchor 14 are magnetized and one end of the anchor 14 is attracted to one end of the core 11 against the force of the spring 21. The anchor 14 moves towards core 11 and stops at a distance equal to the thickness of the nonmagnetic surface treatment conducted on one end of the anchor 14 and one end of the core 11. The anchor 14 is integrally coupled with the ball valve 19 and the ball valve 19 moves along with the anchor 14, separating from the seat section 20 of the valve seat base 12, to thereby open the valve. Thereafter, when the current carrying is completed, the movable valve is pushed back by the force of the spring 21, the ball valve 19 seats on the seat section 20 of the valve seat base 12, and fuel is sealed. Fuel is fed from the fuel inlet side through a filter 32, is passed through an inner section of the spring adjuster 22, an inner section of the spring 21, and an inner section of the anchor 14, and is fed to the seat section 20 after passing through a fuel hole 38 provided on the anchor 14. When the valve is opened, fuel is injected in a prescribed shape of atomization after passing through the orifice plate 16 mounted on the lower end of the valve seat base 12.

In the present embodiment, the cylindrical body 13 is made of non-magnetic material, such as those selected from SUS 304 (Japanese Industrial Standard). However, if the width 4 of the body 13 has a thickness in the range of about 0.2 mm to about 0.1 mm, the entire body 13 can be made of a magnetic material such as those selected from SUS 420 J2 (JIS). This is possible because the magnetic flux generated by the magnetic cylindrical body 13 is negligible and it does not interfere with the operation of the magnetic circuit as described above. Hence, results comparable to those achieved by a non-magnetic body 13 can be achieved.

Figure 3:
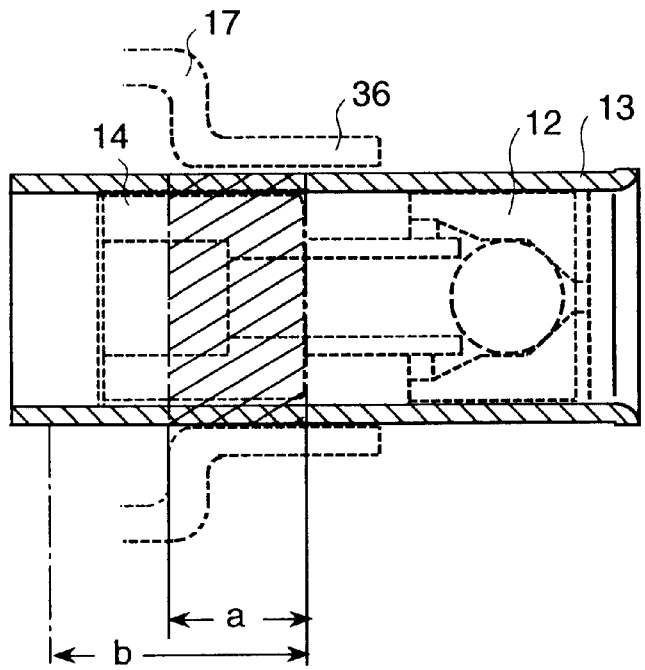
FIG. 3 (1) 1 illustrates a cross-sectional view of another example of the embodiment as described in FIG. 1.
Figure 3:
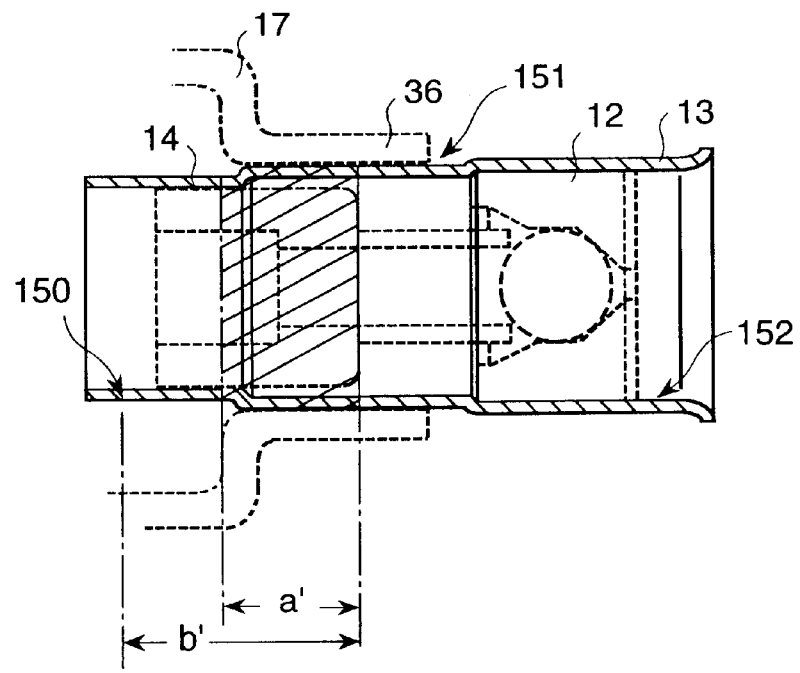

But, if the body 13 has a width 4 which is greater than about 0.2 mm, for instance, about 0.2 mm to about 1.0 mm, and magnetic material is used as the cylindrical body 13, then selective heat treatment or quenching is conducted to make a portion of the magnetic body 1, nonmagnetic. This is necessary because when the magnetic body 13 is too large, the magnetic flux generated by the body 13 is too large and it will interfere with the proper operation of the magnetic circuit. For example, as illustrated in FIG. 3 (1), heat treatment is conducted to quench a portion "a"(represented by the cross-hatching). The portion "a" represents the portion a which housing 17 is fixedly attached with the anchor 14 via body 13. Alternatively, the quenched portion can be extended as illustrated in portion "b" to provide additional beneficial effects. Also, when the cylindrical body 13 is made of magnetic material, the clearance of the butt section is made zero to account for any fluctuations in the magnetic flux.

Figure 2:
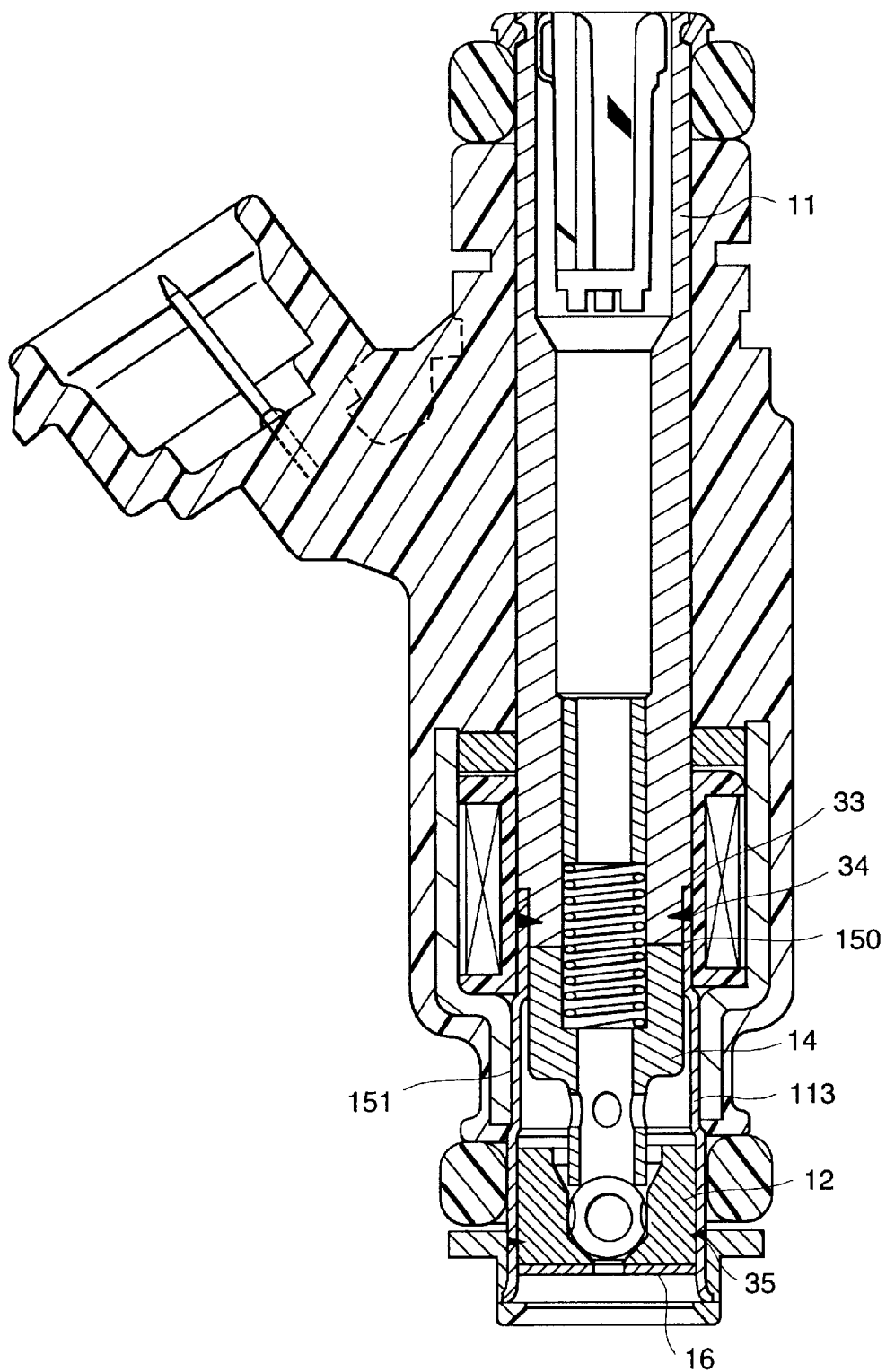
FIG. 2 illustrates a cross-sectional view of a second embodiment of the present invention.

Referring now to FIG. 2, yet another embodiment of the present invention will be described. Portions already described will not be described here. In the cylindrical body 113, the core 11 is press fitted or is provided with a small clearance in a first inner diametrical section 150. The small diametrical section 36 of the housing 17 is press fitted or retained with small clearance in a second outer diametrical section 151. The valve seat body 12 is press fitted or provided with a small clearance and retained in a third inner diametrical section 152. The three kinds of functions are provided in an axial direction. In other words, body 113 is shaped to outline the outer surfaces of the stationary core 11, housing 17, anchor 14 and valve seat base 12. Therefore, the cylindrical body 113 is formed in a shape of the three sections to eliminate any unnecessary materials and for improved precision and operability. Further, in terms of nonmagnetic or magnetic material used for the cylindrical body 113, the same approach as the illustrated embodiment in FIG. 1, described above, can be applied.

FIG. 3 (2) illustrates a cross-sectional view of another example of the embodiment as described in FIG. 2. Heat treatment is conducted to quench a portion "a'" (represented by the cross-hatching). The portion "a'" represents the portion at which housing 14 is fixedly attached with the anchor 14 via body 13. Alternatively, the quenched portion can be extended as illustrated in portion "b'" to provide additional beneficial effects. Also, when the cylindrical body 13 is made of magnetic material, the clearance of the butt section is made zero to account for any fluctuations in the magnetic flux.

Figure 4:
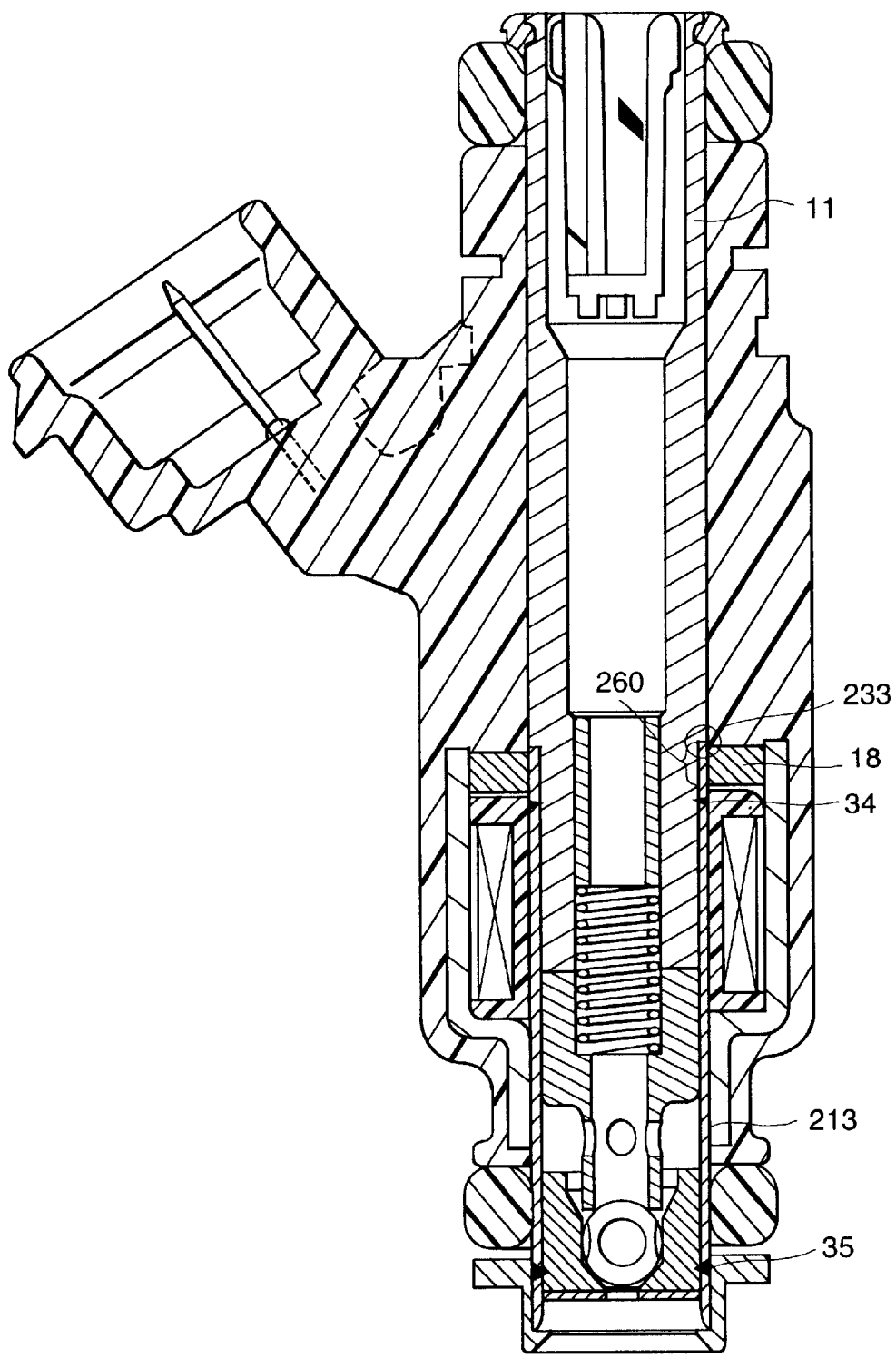
FIG. 4 illustrates a cross-sectional view of a third embodiment of the present invention.

FIG. 4 illustrates another embodiment where an inlet section 233 of a cylindrical body 213 is provided closer, to an inlet side of fuel, as compared to the topmost position of the core plate 18. In this embodiment, any unwanted magnetic flux is diminished by moving the butt section 233 of the core 11 to an exterior portion of the magnetic circuit. Here, the cylindrical body 213 is made out of a non-magnetic material and a reduction in attractive force can be considered since a non-magnetic gap is produced in an overlapped portion in a diametrical direction of the core 11 with the core plate 18. But, similar results can be achieved utilizing a magnetic material.

Hence, the present invention provides a fuel injection valve comprising a magnetic coil and a stationary core adapted to be magnetized upon energization of the magnetic coil. A movable core having one end opposed to one end of the stationary core is also provided, the movable core being movable toward the one end of the stationary core upon magnetization of the stationary core. Also, a valve element on the other end of the movable core is provided which is movable with the movable core to open and close a fuel injection port. The valve element is supported by a valve seat base. Further, a cylindrical body extending from at least the stationary core to the valve seat base is provided which guides the movable core and supports the base.

Figure 5:
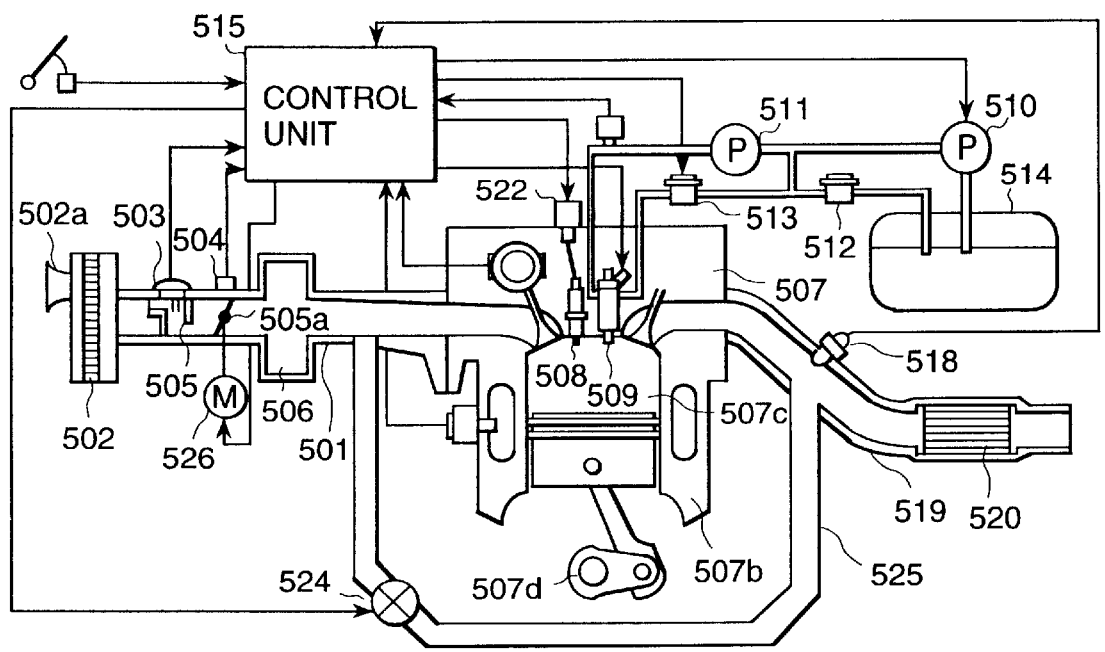
FIG. 5 illustrates an engine utilizing the fuel injection valve of the present invention.

FIG. 5 illustrates an example of an internal combustion engine 507 utilizing the electromagnetic fuel injection valve as described in FIGS. 1–4 of the present invention. Although a specific engine type is described, the present invention can be utilized in any internal combustion engine. Air introduced into a combustion chamber 507c of the engine 507 is a combination of an air intake and EGR gas, wherein the air intake is let in by way of an inlet part 502a of an air cleaner 502 and passes through an air flow measuring device 503, which is one of the means for measuring the operating state of the engine 507. The air further passes through a throttle body 505 in which an electrically controlled throttle valve 505a for controlling the air intake flow quantity is housed. The electrically controlled throttle valve 505a is driven by an electrically controlled throttle motor 526. Next, the air enters a collector 506. From the air flow sensor 503, a signal representing the air intake flow quantity is outputted to a control unit 515, for example, a engine control unit.

A throttle sensor 504, which detects the aperture of the electrically controlled throttle valve for measuring the operating state of the engine, is fitted to the throttle body 505 and its signal is also outputted to the control unit 515. Between an air intake pipe 501 and an exhaust pipe 519, a bypass pipe 525 is provided to constitute bypass piping for recirculating exhaust gas and bypass pipe 525 is provided with an electrically controlled type EGR valve 524, for controlling the recirculating flow quantity of exhaust gas. The air suctioned into the collector 506, after being distributed to air intake pipes 501, each connected to one or another of cylinders 507b of the engine 507, joins EGR gas and is guided to a combustion chamber 507c in each cylinder 507b.

Fuel, such as gasoline, from a fuel tank 514 undergoes primary pressurization by a fuel pump 510, then undergoes secondary pressurization by another fuel pump 511 to a higher pressure while being regulated by a fuel pressure regulator 512 to a constant pressure. The fuel is subjected to another constant pressure by another fuel pressure regulator 513 and injected from injectors 509 of the present invention, one of which is provided for in each cylinder, into combustion chambers 507c. Fuel injected into combustion chambers 507c is raised in voltage by ignition coils 522 and ignited by ignition plugs 508 in response to an ignition signal.

Additionally, a crank angle sensor fitted to a crankshaft 507d of the engine 507 outputs an angle signal POS for detecting a revolution signal, indicating the rotational position of the crankshaft 507d, to the control unit 515. A catalytic converter 520 is provided midway on each exhaust pipe 519 and an A/F sensor 518 provided upstream from the catalytic converter 520 detects the contents of exhausted gas, the resultant detection signal being outputted to the control unit 515.

Although the invention has been described above in connection with exemplary embodiments, it is apparent that many modifications and substitutions can be made without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A fuel injection valve comprising:
   a stationary core and a movable core having one end opposed to one end of said stationary core, said movable core being movable toward said one end of said stationary core upon magnetization of said stationary core and a valve on the other end of said movable core and movable with said movable core, said valve being supported by a valve seat base and a body formed of a magnetic material and extending from at least said stationary core to said base, wherein said body has a nonmagnetic section.

2. The device of claim 1 further comprising a housing surrounding a magnetic coil and having a portion fixedly attached to said body, said nonmagnetic section being in said portion.

3. The device of claim 2 wherein said body is shaped to outline the outer surfaces of said stationary core, housing, movable core and base.

4. The device of claim 2 further comprising a core plate attaching said housing and said stationary core and enclosing said coil.

5. The device of claim 4 wherein said body extends past at least said core plate in a direction away from said movable core.

6. The device of claim 1 wherein said body has a thickness of about 0.1 mm to about 1 mm wide.

7. The device of claim 1 wherein said stationary core has an inset at said one end for receiving said body.

8. The device of claim 7 wherein said inset has a thickness of about 0.1 mm to about 1 mm wide.

9. The device of claim 1 wherein said body is cylindrical.

10. A fuel injection valve comprising:
    a magnetic coil;
    a stationary core adapted to be magnetized upon energization of said magnetic coil;
    a movable core having one end opposed to one end of said stationary core, said movable core being movable toward said one end of said stationary core upon magnetization of said stationary core;
    a valve on the other end of said movable core and movable with said movable core to open and close a fuel injection port, said valve being supported by a valve seat base; and
    a body formed of a magnetic material and extending from at least said stationary core to said valve seat base, wherein said body has a nonmagnetic section and said body guides said movable core and supporting said base.

11. The device of claim 10 further comprising a housing surrounding said coil and having a portion fixedly attached to said body, said nonmagnetic section being in said portion.

12. The device of claim 11 wherein said body is shaped to outline the outer surfaces of said stationary core, housing, movable core and base.

13. The device of claim 11 further comprising a core plate attaching said housing and said stationary core and enclosing said coil.

14. The device of claim 13 wherein said body extends past at least said core plate in a direction away from said movable core.

15. The device of claim 10 wherein said body is has a thickness of about 0.1 mm to about 1 mm wide.

16. The device of claim 10 wherein said stationary core has an inset at said one end for receiving said body.

17. The device of claim 16 wherein said inset has a thickness of about 0.1 mm to about 1 mm wide.

18. The device of claim 1 wherein said body is cylindrical.

19. An engine comprising:

an engine control unit;

a fuel injection valve electrically coupled to said engine control unit for regulating fuel injecting, said valve comprising:

a magnetic coil;

a stationary core adapted to be magnetized upon energization of said magnetic coil;

a movable core having one end opposed to one end of said stationary core, said movable core being movable toward said one end of said stationary core upon magnetization of said stationary core;

a valve on the other end of said movable core and movable with said movable core to open and close a fuel injection port, said valve being supported by a valve seat base; and a body formed of a magnetic material and extending from at least said stationary core to said valve seat base, wherein said body has a nonmagnetic section and said body guides said movable core and supporting said base.

20. The engine of claim 19 further comprising a housing surrounding said coil and having a portion fixedly attached to said body, said nonmagnetic section being in said portion.

21. The engine of claim 20 wherein said body is shaped to outline the outer surfaces of said stationary core, housing, movable core and base.

22. The engine of claim 20 further comprising a core plate attaching said housing and said stationary core and enclosing said coil.

23. The engine of claim 22 wherein said body extends past at least said core plate in a direction away from said movable core.

24. The engine of claim 19 wherein said body has a thickness of about 0.1 mm to about 1 mm wide.

25. The engine of claim 19 wherein said stationary core has an inset at said one end for receiving said body.

26. The engine of claim 25 wherein said inset has a thickness of about 0.1 mm to about 1 mm wide.

27. The engine of claim 19 wherein said body is cylindrical.

* * * * *